(12) United States Patent
Pflug et al.

(10) Patent No.: US 6,726,974 B1
(45) Date of Patent: Apr. 27, 2004

(54) THERMOPLASTIC FOLDED HONEYCOMB STRUCTURE AND METHOD FOR THE PRODUCTION THEREOF

(75) Inventors: Jochen Pflug, Wiesbaden (DE); Ignace Verpoest, Kessel-Lo (BE)

(73) Assignee: K.U. Leuven Research & Development, Leuven (BE)

( * ) Notice: Subject to any disclaimer, the term of this patent is extended or adjusted under 35 U.S.C. 154(b) by 0 days.

(21) Appl. No.: 09/830,258

(22) PCT Filed: Oct. 22, 1999

(86) PCT No.: PCT/EP99/08151

§ 371 (c)(1),
(2), (4) Date: Jul. 24, 2001

(87) PCT Pub. No.: WO00/32382

PCT Pub. Date: Jun. 8, 2000

(30) Foreign Application Priority Data

Oct. 24, 1998 (DE) .......................... 198 49 085

(51) Int. Cl.$^7$ .................................................. B32B 3/00
(52) U.S. Cl. ...................... 428/73; 428/116; 428/118; 428/119; 428/174; 428/178; 264/280; 264/285; 264/319; 264/331.11; 264/339

(58) Field of Search ................... 428/116, 117, 428/118, 72, 73, 119, 174, 178; 264/239, 165, 280, 285, 293, 299, 319, 330, 331.11, 339

(56) References Cited

U.S. PATENT DOCUMENTS 4,897,971 A * 2/1990 Durston
5,028,474 A * 7/1991 Czaplicki
5,399,406 A * 3/1995 Matsuo et al.

FOREIGN PATENT DOCUMENTS

DE 197 16 637 10/1998
FR 1509018 1/1968
WO WO 97/03816 2/1997

* cited by examiner

*Primary Examiner*—Deborah Jones
*Assistant Examiner*—Wendy Boss
(74) *Attorney, Agent, or Firm*—Barnes & Thornburg

(57) ABSTRACT

A thermoplastic folded honeycomb structure and method for the production thereof A strip of material is plastically deformed perpendicular to the plane of the material and folded in the direction of conveyance until the cell walls meet and are joined.

11 Claims, 2 Drawing Sheets

THERMOPLASTIC FOLDED HONEYCOMB STRUCTURE AND METHOD FOR THE PRODUCTION THEREOF

The invention relates to a preferably thermoplastic folded honeycomb and to a process for producing preferably thermoplastic folded honeycombs.

Folded honeycombs of this type (WO 97/03816) are produced continuously from a single layer (a flat body). The hexagonal cells are folded herein after the introduction of cuts and are bridged by covering-layer connecting surfaces. In all known folded honeycombs of this type, first of all cuts which weaken the flat body have to be introduced. It is generally assumed that without cuts, the three-dimensional structures introduced into the layer will be distorted by the folding in such a way that the cells formed thereby become weaker.

The object of the invention is to be able to produce folded honeycombs with a good attachment to the covering layers without the introduction of cuts. The object set is achieved on the basis of the measures of claims 1 and 6 and further developed by further features of the subclaims.

In the invention, the flat body (a material web) is plastically deformed perpendicularly to the material plane and narrowed (folded) in the conveying direction, until the cell walls meet and can be connected. In this way, a honeycomb layer with closed covering layers is formed. The material comes furthermore to lie alternately doubled in the covering-layer planes and ensures thereby a good, flat attachment of all the honeycomb cell walls to both covering layers.

Figure 1:
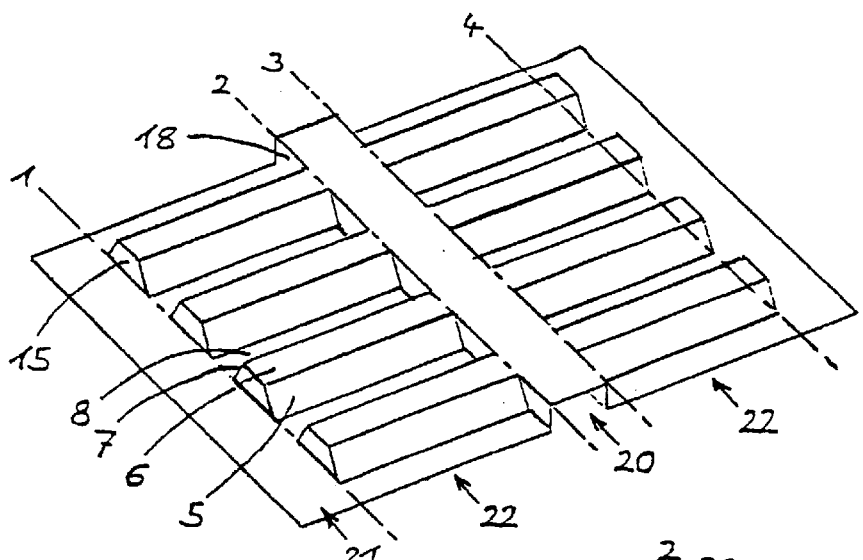
Figure 2:
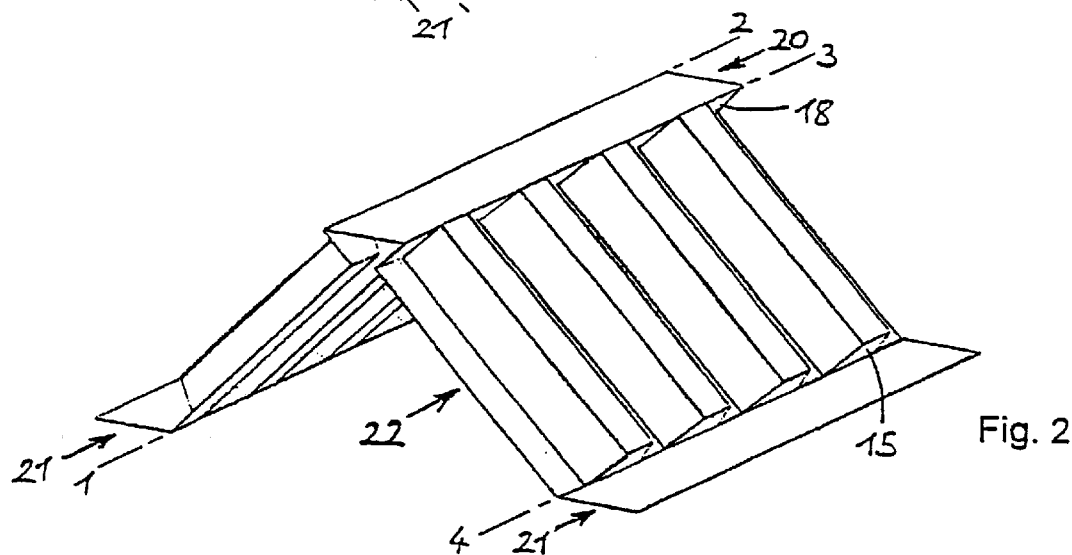
Figure 3:
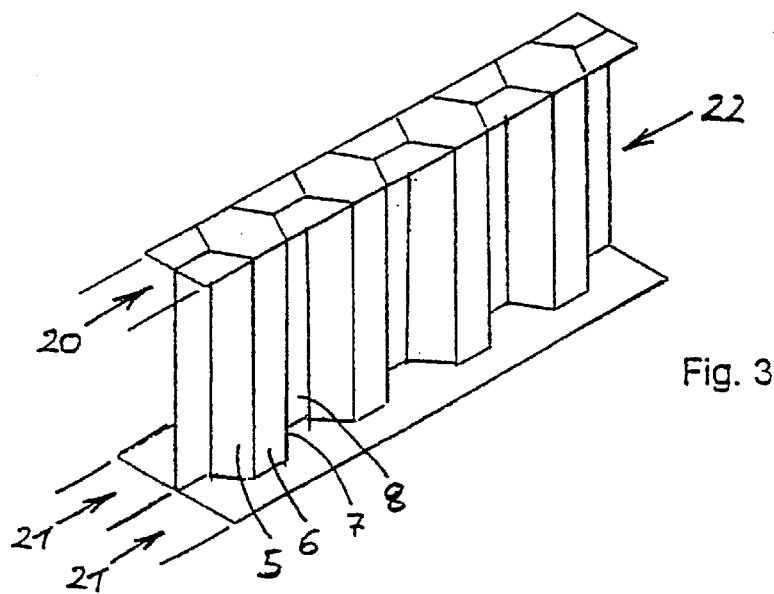
Figure 4:
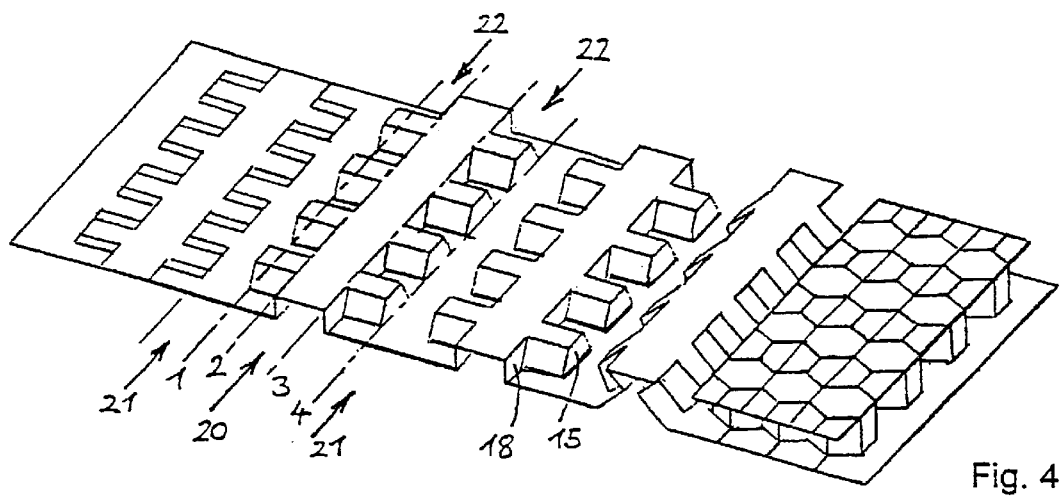
Figure 5:
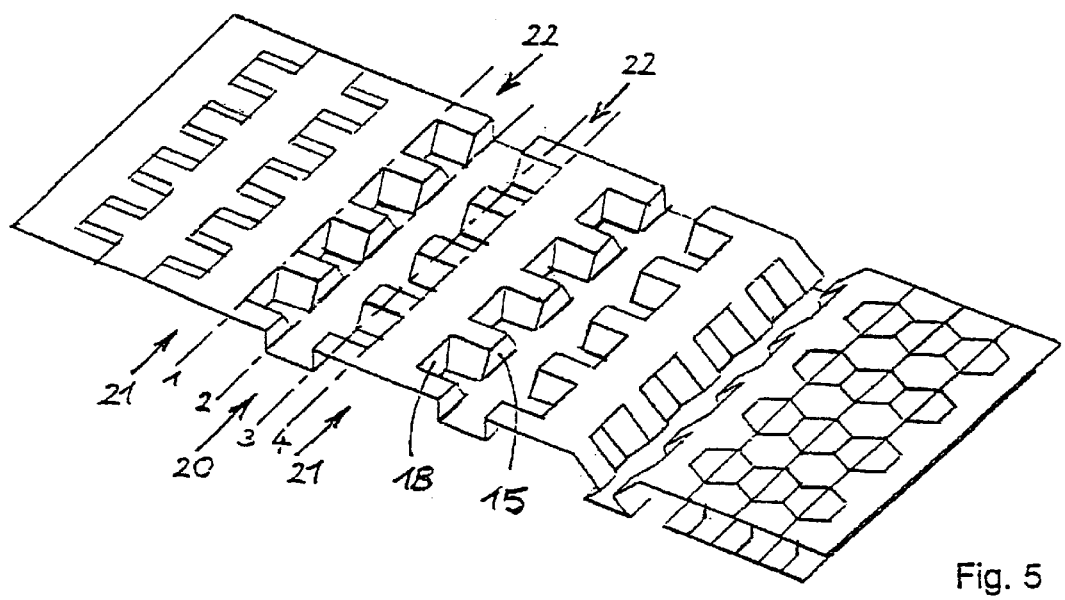

An exemplary embodiment will be described with reference to the drawings, which show:

FIG. 1 the plastic deformations perpendicular to the material web,

FIG. 2 the folding process for forming the honeycomb cells,

FIG. 3 a row of hexagonal honeycomb cells following the connection of the cell walls, FIG. 4 the production of the folded honeycomb (regions formed upwardly), FIG. 5 shows a further perspective illustration of intermediate states during the production of the folded honeycomb (regions formed downwardly).

FIG. 1 shows a section of a flat web of thin thermoplastic polymer, fiber composite material, plastically deformable paper or metal sheet, which has plastic deformations perpendicular to the material web. In the regions 20, the material is formed complete, i.e. rectangularly, and in the regions 22 polygonally, for example trapezoidally, sinusoidally, arcuately or the like, from the plane of the web. Since the surface regions 8 remain in the plane of the web, the material in the surface regions 5 and 7 is plastically deformed. Furthermore, the material is stretched at the transitions to the regions 20 and 21 and forms the areas 15 and 18, which are substantially perpendicular to the material web. The deformation of the web material in the regions 22 serves the formation of three-dimensional shapes, which form the walls of cell halves in the folded end product. The cells are structural and load bearing elements of the folded end product, the walls of which extend transversely to the longitudinal direction of the folded end product. In the folded end product, the cells formed by folding are preferably cylindrical in cross section, the axis of the cylinder extending transversely with respect to the longitudinal direction of the folded end product. The cross-sectional shape of a cell can be selected as desired, for example circular or polygonal, in particular even-numbered polygonal, for example hexagonal. The present invention includes a mixture of cells with different cross-sectional shapes.

FIG. 2 shows a further intermediate state in the production of the folded honeycomb. The narrowing of the deformed material web occurs by the folding operation of the material web about the folding lines 1, 2, 3 and 4 by means of this folding operation, the surface areas 18 are folded onto the surface areas of the region 20, and the surface areas 15 come to lie flat on the surface areas of the regions 21. A deformation of the trapezoidal structures formed in the material web is thereby avoided. This folding operation could be carried out, for example, by means of a flat hot tool which can also preheat the cell walls which meet each other for welding.

FIG. 3 shows a row of hexagonal honeycomb cells after the connection of the cell walls. As a result of being folded together, the adjacent regions 20 (respectively 21) butt against one another and can preferably be connected to one another to form load bearing covering layers. Under certain circumstances, it is then possible to dispense with a complete surface area connection of the cell walls. After a connection of the cell walls and the adjacent regions 20 (respectively 21), the result is preferably air-tight, closed hexagonal spaces.

FIG. 4 shows intermediate states in the production of the folded honeycomb, with regions formed upwardly. The production can be automated and run continuously. The obvious procedure is to use rotating tools. Accordingly, a substantial aspect of the present invention is to form a folded honeycomb by means of non-cutting, continuous, plastic rotation forming of a material web. The plastic deformation can be carried out, for example, by means of a "rotation thermoforming" process, such as is common in the production of air-bubble film. There, the material is drawn by a profiled roll with the aid of vacuum. Interengaging profiles running against each other can also be used.

FIG. 5 shows intermediate states in the production of a further folded honeycomb according to the present invention, with regions formed downwardly. Additional covering layers to accommodate higher tensile and compressive loads can be fixed or adhesively bonded onto the honeycomb, either directly or subsequently.

Depending on the starting material, the folded honeycomb can already form a rigid, lightweight sandwich board, even without covering layers, and can be processed for structural components or as packaging material.

The present invention does not rule out the possibility that, following the formation of the trapezoidal, sinusoidal or circular structures in the material web, and in particular after the folding of the deformed material web, cracks arise. This can lead to the extent at which the sub-areas (15 respectively 18) wholly or partly disappear.

What is claimed is:

1. Folded honeycomb, formed from a plurality of cells arranged in rows, with the following features:
   the cells have lateral cell walls which adjoin one another in the form of a ring and are bounded toward two opening sides of the cell by covering-layer planes;
   a cell wall of one cell adjoining the cell wall of another cell in a honeycomb structure;
   the folded honeycomb has a plurality of polygonally, sinusoidally or arcuately shaped regions and strip-shaped regions;
   the polygonally, sinusoidally or arcuately shaped regions are folded through about 90° with respect to the strip-shaped regions;

in which the cells are each bridged completely in the two covering-layer planes;

the folded honeycomb is formed from a substantially uncut flat body;

the plurality of polygonally, sinusoidally or arcuately shaped regions are formed by plastic deformation of the substantially uncut body; and sub-areas produced by the plastic deformation lie on the strip-shaped regions in the covering-layer planes.

2. Folded honeycomb according to claim 1, in which at least a part of the cell walls are wholly or partly permanently connected to one another.

3. Folded honeycomb according to claim 1, in which the sub-areas produced by the plastic deformation are wholly or partly permanently connected to surface areas lying on them and belonging to the strip-shaped regions.

4. Folded honeycomb according to claim 2, in which that the sub-areas produced by the plastic deformation are wholly or partly permanently connected to the surface areas lying on them and belonging to the strip-shaped regions.

5. Folded honeycomb according to claim 1, in which the body is a thermoplastic polymer, a fiber composite material or a plastically deformable paper or metal sheet.

6. Folded honeycomb according to claim 1, in which the cells are all the same.

7. Process for producing a folded honeycomb as defined in claim 1, with the following steps:

a) a flat body composed of a plastically deformable material is provided;

b) the flat body is polygonally, sinusoidally or arcuately plastically deformed in first strip-shaped regions, second strip-shaped regions located between the first strip-shaped regions being alternately formed wholly in the plane of the flat initial body or out of this plane; and c) the polygonally, sinusoidally or arcuately plastically formed regions are folded through about 90° with respect to the second strip-shaped regions to form cells having cell walls which adjoin one another in the form of a ring so that a cell wall of one cell adjoins the cell wall of another cell in a honeycomb structure.

8. Process according to claim 7, in which at least a part of mutually contacting surface areas and/or edges are firmly connected to one another.

9. Process according to claim 7, in which the deformable material is a thermoplastic polymer, a fiber composite material or a plastically deformable paper or metal sheet.

10. Process according to claim 7, in which the polygonal, sinusoidal or arcuate plastic deformation is carried out by means of a non-cutting rotation process.

11. Process according to claim 7, which the deformation is carried out by means of a rotation-thermoforming process.

\* \* \* \* \*